(12) United States Patent
Sardella et al.

(10) Patent No.: US 8,194,547 B1
(45) Date of Patent: Jun. 5, 2012

(54) CONFIGURING FLOW CONTROL SETTINGS

(75) Inventors: Steven D. Sardella, Hudson, MA (US); Douglas Sullivan, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 510 days.

(21) Appl. No.: 11/529,901

(22) Filed: Sep. 29, 2006

Related U.S. Application Data (60) Provisional application No. 60/821,625, filed on Aug. 7, 2006.

(51) Int. Cl.
*H04L 12/56* (2006.01)
*G06F 15/16* (2006.01)

(52) U.S. Cl. .......................... 370/235; 370/412; 709/232

(58) Field of Classification Search .......... 370/229–235, 370/241, 250–253, 351, 389, 395.1–395.75, 370/400–402, 411–413, 230.1, 235.1, 395.7–395.72; 709/232, 234, 235, 236
See application file for complete search history.

(56) References Cited

U.S. PATENT DOCUMENTS

| | | | | |
|---|---|---|---|---|
| 6,078,565 | A * | 6/2000 | Ben-Michael et al. | 370/236 |
| 6,594,234 | B1 * | 7/2003 | Chard et al. | 370/236 |
| 6,810,031 | B1 * | 10/2004 | Hegde et al. | 370/351 |
| 7,042,842 | B2 * | 5/2006 | Paul et al. | 370/229 |
| 7,310,309 | B1 * | 12/2007 | Xu | 370/230.1 |
| 2002/0055993 | A1 * | 5/2002 | Shah et al. | 709/223 |
| 2002/0085493 | A1 * | 7/2002 | Pekkala et al. | 370/235 |
| 2002/0159385 | A1 * | 10/2002 | Susnow et al. | 370/229 |
| 2003/0026267 | A1 * | 2/2003 | Oberman et al. | 370/397 |
| 2003/0126223 | A1 * | 7/2003 | Jenne et al. | 709/212 |
| 2005/0018604 | A1 * | 1/2005 | Dropps et al. | 370/229 |
| 2005/0036502 | A1 * | 2/2005 | Blanc et al. | 370/412 |
| 2005/0174936 | A1 * | 8/2005 | Betker | 370/230 |
| 2007/0121495 | A1 * | 5/2007 | Breti et al. | 370/229 |
| 2007/0133415 | A1 * | 6/2007 | Spink | 370/235 |

OTHER PUBLICATIONS

Ravi Budruk, Don Anderson, Tom Shanley, PCI Express System Architecture, Addison-Wesley, 2004, 9th Edition, 38 pages.*
Ravi Budruk, PCI Express System Architecture, 2003, Addison-Wesley, pp. 52-880.*
Ravi Budruk, PCI Express System Architecture, 2004, Mind Share, Inc, 9th, 52, 54, 286-290, 303, 304, 306, 310, 488-489, 686-688.*
Ravi Budruk, PCI Express Architecture, Apr. 2008, Addison-Wesley, 9th Edition, 1-1043.*

* cited by examiner

*Primary Examiner* — Chi Pham
*Assistant Examiner* — Prince A Mensah
(74) *Attorney, Agent, or Firm* — Krishnendu Gupta; Jason A. Reyes; Deepika Bhayana (57) ABSTRACT

Flow control settings are configured. Credit settings for credit types of input/output interconnect ports are programmed at a low value. The system type of a system containing the input/output interconnect ports is detected. The credit settings are reprogrammed in accordance with the system type.

12 Claims, 6 Drawing Sheets

---

NOTES:
- ALL VALUES IN DECIMAL EXCEPT REGISTERS AND OFFSETS
- 1 PAYLOAD CREDIT = 16 BYTES

| | VC0 | | | VC1 | | | TOTAL | CHECK |
|---|---|---|---|---|---|---|---|---|
| | POSTED | NON-POSTED | COMPLETION | POSTED | NON-POSTED | COMPLETION | | |
| HEADER CREDITS | 23 | 3 | 3 | 1 | 1 | 1 | 32 | OKAY |
| PAYLOAD CREDITS / HEADER CREDIT (APPROXIMATE) | 4 | 3 | 29 | 16 | 1 | 16 | | |
| PAYLOAD CREDITS | 88 | 9 | 88 | 16 | 1 | 16 | 218 | OKAY |
| REG VALUE | 0x2E58 | 0x609 | 0x658 | 0x210 | 0x201 | 0x210 | | |
| | WRITE TO REGISTER OFFSETS LISTED BELOW | | | | | | | |
| SPECIFIC DEVICE PORT 0 REG OFFSET | 0xA00 | 0xA04 | 0xA08 | 0xA0C | 0xA10 | 0xA14 | | |
| SPECIFIC DEVICE PORT 1 REG OFFSET | 0xA18 | 0xA1C | 0xA20 | 0xA24 | 0xA28 | 0xA2C | | |
| SPECIFIC DEVICE PORT 2 REG OFFSET | 0xA30 | 0xA34 | 0xA38 | 0xA3C | 0xA40 | 0xA44 | | |
| SPECIFIC DEVICE PORT 3 REG OFFSET | 0xA48 | 0xA4C | 0xA50 | 0xA54 | 0xA58 | 0xA5C | | |

FOR A SPECIFIC DEVICE, NEED TO REPEAT FOR STATION 1: OFFSET 0x08xxx
(WHICH xxx IS REG OFFSET FROM ABOVE)

NOTE: BOLD ARE CALCULATED

NOTES:
- ALL VALUES IN DECIMAL EXCEPT REGISTERS AND OFFSETS
- 1 PAYLOAD CREDIT = 16 BYTES

| | VC0 | | | VC1 | | | TOTAL | CHECK |
|---|---|---|---|---|---|---|---|---|
| | POSTED | NON-POSTED | COMPLETION | POSTED | NON-POSTED | COMPLETION | | |
| HEADER CREDITS | 23 | 3 | 3 | 1 | 1 | 1 | 32 | OKAY |
| PAYLOAD CREDITS / HEADER CREDIT (APPROXIMATE) | 4 | 3 | 29 | 16 | 1 | 16 | | |
| PAYLOAD CREDITS | 88 | 9 | 88 | 16 | 1 | 16 | 218 | OKAY |
| REG VALUE | 0x2E58 | 0x609 | 0x658 | 0x210 | 0x201 | 0x210 | | |

WRITE TO REGISTER OFFSETS LISTED BELOW

| SPECIFIC DEVICE PORT 0 REG OFFSET | 0xA00 | 0xA04 | 0xA08 | 0xA0C | 0xA10 | 0xA14 |
|---|---|---|---|---|---|---|
| SPECIFIC DEVICE PORT 1 REG OFFSET | 0xA18 | 0xA1C | 0xA20 | 0xA24 | 0xA28 | 0xA2C |
| SPECIFIC DEVICE PORT 2 REG OFFSET | 0xA30 | 0xA34 | 0xA38 | 0xA3C | 0xA40 | 0xA44 |
| SPECIFIC DEVICE PORT 3 REG OFFSET | 0xA48 | 0xA4C | 0xA50 | 0xA54 | 0xA58 | 0xA5C |

FOR A SPECIFIC DEVICE, NEED TO REPEAT FOR STATION 1: OFFSET 0x08xxx
(WHICH xxx IS REG OFFSET FROM ABOVE)

NOTE: BOLD ARE CALCULATED

CONFIGURING FLOW CONTROL SETTINGS

CROSS-REFERENCE TO RELATED APPLICATIONS

This application claims the benefit of U.S. Provisional Application No. 60/821,625, filed Aug. 7, 2006, entitled CONFIGURING FLOW CONTROL SETTINGS, which is incorporated herein by reference in its entirety.

FIELD OF THE INVENTION

The present invention relates to configuring flow control settings.

BACKGROUND

Interconnections between nodes on a data link, e.g., a network, typically include some type of a traffic flow control technique. A credit-based flow control technique is one such traffic flow control technique. The credit-based flow control techniques currently available in the market and generally known to those skilled in the art are typically designed for flow control between two switch elements, referred to as hubs, at a network level on a one-to-one basis. The hub-to-hub, credit-based, flow control typically resolves congestion earlier as compared to end-to-end flow control techniques, thereby aiding performance.

The need for high performance in information technology systems, particularly high capacity information technology systems, is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss.

As is known in the art, large computer systems and data servers sometimes require large capacity data storage systems. One type of data storage system is a magnetic disk storage system. Here a bank of disk drives and the computer systems and data servers are coupled together through an interface. The interface includes storage processors that operate in such a way that they are transparent to the computer. That is, data is stored in, and retrieved from, the bank of disk drives in such a way that the computer system or data server merely thinks it is operating with one memory. One type of data storage system is a RAID data storage system. A RAID data storage system includes two or more disk drives in combination for fault tolerance and performance.

An I/O interconnect architecture that is intended to support a wide variety of computing and communications platforms is the Peripheral Component Interconnect (PCI) Express architecture described in the PCI Express Base Specification, Rev. 1.0a, Apr. 15, 2003 (hereinafter, "PCI Express Base Specification" or "PCI Express standard"). The PCI Express architecture describes a fabric topology in which the fabric is composed of point-to-point links that interconnect a set of devices. For example, a single fabric instance (referred to as a "hierarchy") can include a Root Complex (RC), multiple endpoints (or I/O devices) and a switch. The switch supports communications between the RC and endpoints, as well as peer-to-peer communications between endpoints. The PCI Express architecture is specified in layers, including software layers, a transaction layer, a data link layer and a physical layer. The software layers generate read and write requests that are transported by the transaction layer to the data link layer using a packet-based protocol. The data link layer adds sequence numbers and CRC to the transaction layer packets. The physical layer transports data link packets between the data link layers of two PCI Express agents.

The switch includes a number of ports, with at least one port being connected to the RC and at least one other port being coupled to an endpoint as provided in the PCI Express Base Specification. The RC, switch, and endpoints may be referred to as "PCI Express devices".

The switch may include ports connected to non-switch ports via corresponding PCI Express links, including a link that connects a switch port to a root complex port. The switch enables communications between the RC and endpoints, as well as peer-to-peer communications between endpoints. A switch port may be connected to another switch as well.

Typically, the switch has a controller subsystem which is a virtual port for the system. The controller subsystem has the intelligence for the switch and typically contains a microcontroller. The controller subsystem is in communication with the switch's other ports to set the configuration for the ports on power up of the system, to check the status of each of the ports, to process transactions which terminate within the switch itself, and to generate transactions which originated from the switch itself.

As noted above, in PCI Express, information is transferred between devices using packets. In order to meet various transactions such as a memory write request, a memory read request, an I/O write request and an I/O read request, not only packets including a header and variable-length data, but also packets including only a header and not data are used in the PCI Express. For example, a memory read request packet that makes a memory read request and an I/O read request packet that makes an I/O read request each include only a header.

Credit-based flow control is used in PCI Express. In this flow control, a receiving device previously notifies a transmitting device of a credit indicative of the size of an effective receiving buffer in the receiving device as flow control information. The transmitting device can transmit information for the size specified by the credit. In PCI Express, for example, a timer can be used as a method for transmitting credits regularly from the receiving device to the transmitting device.

In particular, according to the PCI Express Link Layer definition a link may be down (DL_Inactive=no transmission or reception of packets of any type), fully active (DL_Active), i.e., fully operational and capable of transmitting and receiving packets of any type, or in the process of being initialized (DL_Init). Link states may be communicated between link partners via DLLPs (Data Link Layer Packets), which are 6-byte packets that communicate link management specific information between the two devices sharing the link. Link state DLLPs have strict priority over all packets (transaction layer packets (TLPs) and DLLPs) except packets that are in-flight. Link state acknowledgements are sent as early as possible, i.e., as soon as the transmission of the packet currently occupying the link is completed.

The PCI Express architecture supports the establishment of direct endpoint-to-endpoint logical paths known as Virtual Channels (VCs). This enables a single switched fabric network to service multiple, independent logical interconnects simultaneously, each VC interconnecting end nodes for control, management, and data. Each VC provides its own queue so that blocking in one VC does not cause blocking in another. Since each VC has independent packet ordering requirements, each VC may be scheduled without dependencies on the other VCs.

The architecture defines three VC types: Bypass Capable Unicast (BVC); Ordered-Only Unicast (OVC); and Multicast (MVC). BVCs have two queues—an ordered queue and a bypass queue. The bypass queue provides BVCs bypass capability, which may be necessary for deadlock free tunneling of protocols. OVCs are single queue unicast VCs, which may be suitable for message oriented "push" traffic. MVCs are single queue VCs for multicast "push" traffic.

When the fabric is powered up, link partners in the fabric may negotiate the largest common number of VCs of each VC type. During link training, the largest common sets of VCs of each VC type are initialized and activated prior to any non-DLLP packets being injected into the fabric.

The architecture provides a number of congestion management techniques, one of which is the credit-based flow control (FC) technique used to prevent packets from being lost due to congestion. Link partners (e.g., an endpoint and a switch element) in the network exchange FC credit information, e.g., indicating the local device's available buffer space for a particular VC, to guarantee that the receiving end of a link has the capacity to accept packets.

FC credits may be computed on a VC-basis by the receiving end of the link and communicated to the transmitting end of the link. Typically, packets may be transmitted only when there are enough credits available for a particular VC to carry the packet. Upon sending a packet, the transmitting end of the link may debit its available credit account by an amount of FC credits that reflects the size of the sent packet. As the receiving end of the link processes (e.g., forwards to an endpoint) the received packet, space is made available on the corresponding VC and FC credits are returned to the transmission end of the link. The transmission end of the link then adds the FC credits to its credit account.

FC credit initialization and updates are communicated through the exchange of DLLPs between link partners. InitFC1 and InitFC2 DLLPs are exchanged between link partners and provide the FC credit initialization of both unicast VCs (VCs 0-15) and multicast VCs (VCs 16-19). InitFC1 and InitFC2 DLLPs specifying a VC Index in the range of VC0-VC7 provide initial flow control credit information for any supported BVCS, providing initial values for the bypass queue and the ordered queue. OVC and MVC InitFC DLLPs (VC Indexes in the range of VC8-VC13) provide initial credit information for two VCs each.

VCs may be initialized beginning with VC number 0 and continuing until VC 19 in ascending order. PCI Express ports exchange InitFC1 and InitFC2 DLLPs for VC 0-19 even if they do not implement all twenty VCs. InitFC DLLPs for unsupported VC numbers must indicate credit values of 000h in their corresponding credit fields.

After initialization, the ports may refresh their link partner's credit information by periodically sending them FC credit update information. While FC credit accounting is typically tracked by a transmitting port between FC credit updates, an FC Update DLLP takes precedence over locally calculated credit availability information. With each FC credit update, the receiving side of the FC credit update may discard any local FC credit availability tracking information and resynchronize with the credit information provided by the FC Update DLLP.

In particular, flow control logic distinguishes three types of TLPs:
Posted Requests (P)—Messages and Memory Writes
Non-Posted Requests (NP)—All Reads, I/O, and Configuration Writes
Completions (CPL)—Associated with corresponding NP Requests In addition, flow control logic distinguishes the following types of TLP information within each of the three types:
Headers (H)
Data (D)
Thus, there are six types of information tracked by flow control logic for each Virtual Channel:
PH (Posted Request headers)
PD (Posted Request Data payload)
NPH (Non-Posted Request headers)
NPD (Non-Posted Request Data payload)
CPLH (Completion headers)
CPLD (Completion Data payload)

For each type, the receiver maintains a value that is a count of the total number of credits granted to the transmitter since initialization (CREDITS_ALLOCATED). This value is included in the InitFC and UpdateFC DLLPs, and is incremented as additional receive buffer space is made available by processing received TLPs.

The transmitter maintains a value that is the most recent number of credits advertised by the receiver (CREDIT_LIMIT). This value represents the total number of credits made available by the receiver since flow control initialization.

For each UpdateFC DLLP received by the transmitter, if CREDIT_LIMIT is not equal to the CREDITS_ALLOCATED value in the UpdateFC DLLP, CREDIT_LIMIT is set to the CREDITS_ALLOCATED value in the UpdateFC DLLP. Thus, for example, if the transmitter somehow misses an UpdateFC DLLP, the transmitter is made fully up to date in the next UpdateFC DLLP that is received.

The transmitter has a gating function that determines whether sufficient credits have been advertised to permit the transmission of a given TLP. If the transmitter does not have enough credits to transmit the TLP, it must block the transmission of the TLP, possibly stalling other TLPs that are using the same Virtual Channel. The transmitter has enough credits if the credits needed does not exceed the difference between CREDIT_LIMIT and the total number of credits already consumed by the transmitter (CREDITS_CONSUMED).

A typical PCI Express device has a fixed amount of memory available to be used in connection with credits, such that credit allocation is a zero sum system: increasing the maximum number of credits allowed for one type of information requires decreasing the maximum number of credits allowed for another type of information.

An interconnect architecture may be used in a modern computer architecture that may be viewed as having three distinct subsystems which when combined, form what most think of when they hear the term computer. These subsystems are: 1) a processing complex; 2) an interface between the processing complex and I/O controllers or devices; and 3) the I/O (i.e., input/output) controllers or devices themselves. A processing complex may be as simple as a single microprocessor, such as a standard personal computer microprocessor, coupled to memory. Or, it might be as complex as two or more processors which share memory.

A blade server is essentially a processing complex, an interface, and I/O together on a relatively small printed circuit board that has a backplane connector. The blade is made to be inserted with other blades into a chassis that has a form factor similar to a rack server today. Many blades can be located in the same rack space previously required by just one or two rack servers. Blade servers typically provide all of the features of a pedestal or rack server, including a processing complex, an interface to I/O, and I/O. Further, the blade servers typically integrate all necessary I/O because they do not have an external bus which would allow them to add other I/O on to them. So, each blade typically includes such I/O as Ethernet (10/100, and/or 1 gig), and data storage control (SCSI, Fiber Channel, etc.).

The interface between the processing complex and I/O is commonly known as the Northbridge or memory control hub (MCH) chipset. On the "north" side of the chipset (i.e., between the processing complex and the chipset) is a bus referred to as the HOST bus. The HOST bus is usually a proprietary bus designed to interface to memory, to one or more microprocessors within the processing complex, and to the chipset. On the "south" side of the chipset are a number of buses which connect the chipset to I/O devices. Examples of such buses include: ISA, EISA, PCI, PCI-X, and PCI Express.

SUMMARY OF THE INVENTION

Flow control settings are configured. Credit settings for credit types of input/output interconnect ports are programmed at a low value. The system type of a system containing the input/output interconnect ports is detected. The credit settings are reprogrammed in accordance with the system type.

One or more embodiments of the invention may provide one or more of the following advantages.

After flow control settings have already been configured, the settings can be configured again to tailor credit settings to a particular application, e.g., to help prevent excessive concurrency problems and back pressure among a chain of switches or devices.

Other advantages and features will become apparent from the following description, including the drawings, and from the claims.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION

As described in more detail below, in a flow control enhancement technique, flow control credit settings for types (e.g., all credit types) of ports (e.g., all ports) of PCI Express devices (e.g., all PCI Express switches) are programmed at power-on/reset to low values, e.g., a value of 1 for Virtual Channels that are used, and a value of 0 for unused Virtual Channels. This may be done through use of an EEPROM, for example. As the system containing the PCI-Express devices starts up (e.g., boots), the system type is detected (e.g., by firmware) and the credit settings are reprogrammed accordingly, for each port and each credit type. In at least some implementations, credit values are always maintained or increased, and are never decreased. This technique is applicable to any PCI Express device that allows flexible programming of credits and credit settings.

Figure 1:
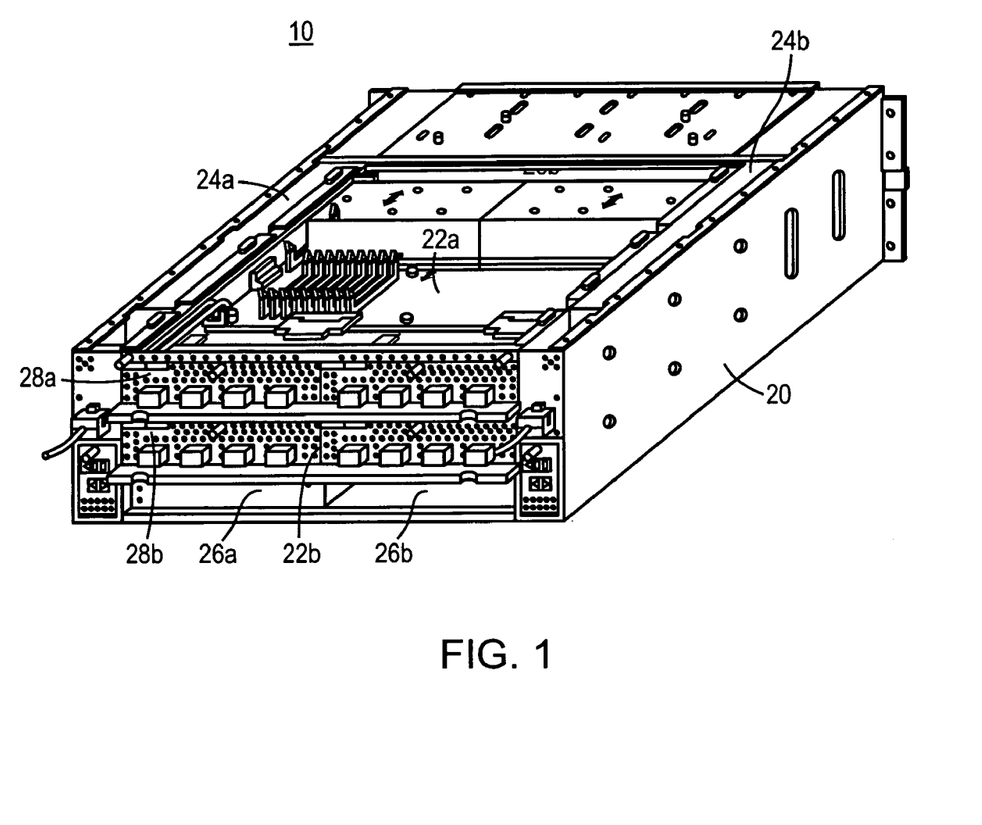
FIG. 1 is an isometric view of a storage system in which the invention may be implemented.

Referring to FIG. 1, there is shown a portion of a storage system 10 that is one of many types of systems in which the principles of the invention may be employed. The storage system 10 shown may operate stand-alone or may populate a rack including other similar systems. The storage system 10 may be one of several types of storage systems. For example, if the storage system 10 is part of a storage area network (SAN), it is coupled to disk drives via a storage channel connection such as Fibre Channel. If the storage system 10 is, rather, a network attached storage system (NAS), it is configured to serve file I/O over a network connection such as an Ethernet.

Figure 2:
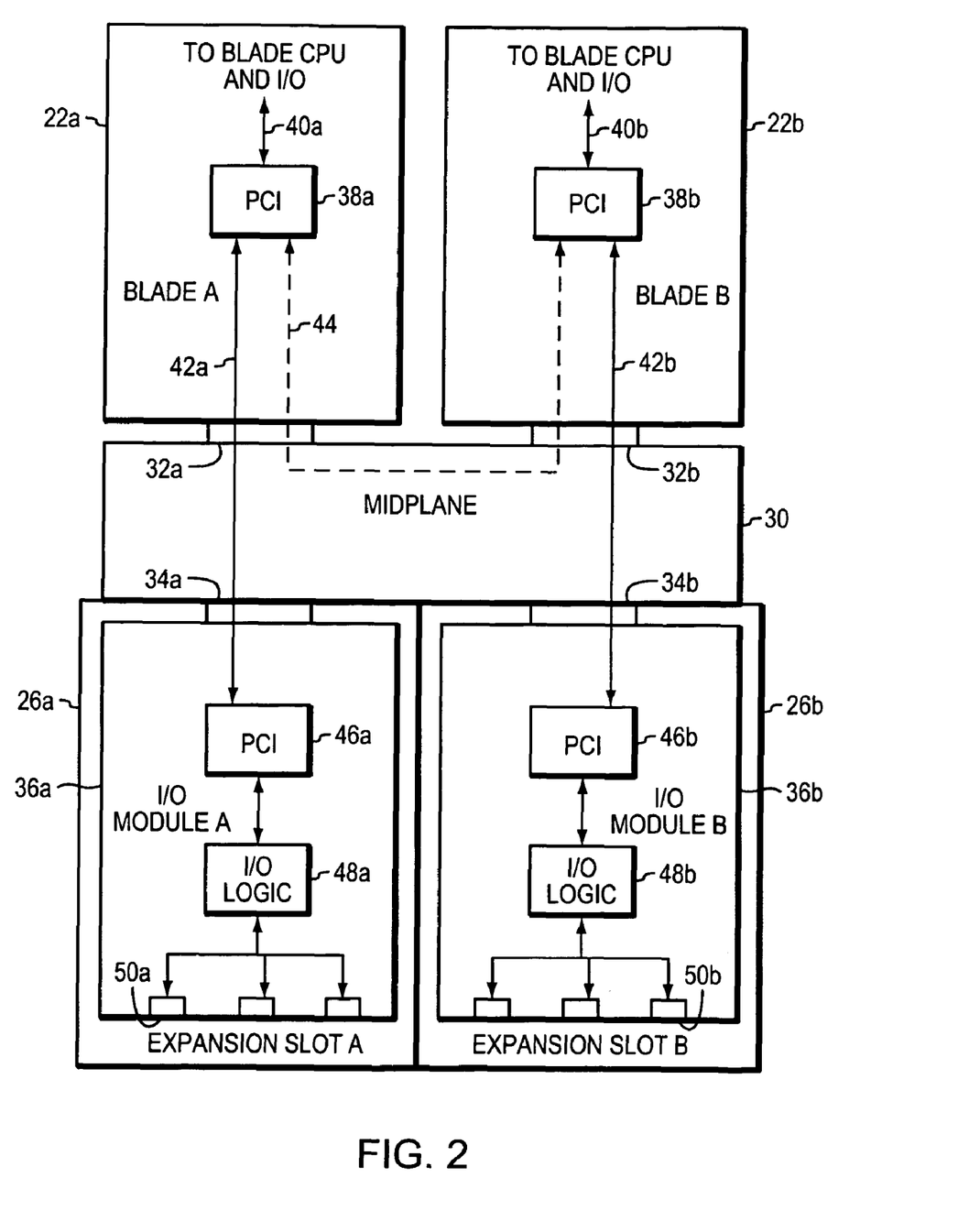
FIG. 2 is a schematic representation of a first configuration of the system of FIG. 1 showing blades, two expansion slots, and two I/O modules installed in the expansion slots.

The storage system 10 includes within a chassis 20 a pair of blades 22a and 22b, dual power supplies 24a,b and dual expansion slots 26a,b. The blades 22a and 22b are positioned in slots 28a and 28b respectively. The blades 22a,b include CPUs, memory, controllers, I/O interfaces and other circuitry specific to the type of system implemented. The blades 22a and 22b are preferably redundant to provide fault tolerance and high availability. The dual expansion slots 26a,b are also shown positioned side by side and below the blades 22a and 22b respectively. The blades 22a,b and expansion slots 26a,b are coupled via a midplane 30 (FIG. 2). In accordance with the principles of the invention, the expansion slots 26a,b can be used in several ways depending on system requirements.

In FIG. 2, the interconnection between modules in the expansion slots 26a,b and the blades 22a,b is shown schematically in accordance with a first configuration. Each blade 22a,b is coupled to the midplane 30 via connectors 32a,b. The expansion slots 26a,b are also shown coupled to the midplane 30 via connectors 34a,b. The blades 22a,b can thus communicate with modules installed in the expansion slots 26a,b across the midplane 30. In this configuration, two I/O modules 36a and 36b are shown installed within the expansion slots 26a and 26b respectively and thus communicate with the blades 22a,b separately via the midplane 30.

In accordance with a preferred embodiment, the blades 22a,b and I/O modules 36a,b communicate via PCI Express buses. Each blade 22a,b includes a PCI Express switch 38a,b that drives a PCI Express bus 40a,b to and from blade CPU and I/O resources. The switches 38a,b split each PCI Express bus 40a,b into two PCI Express buses. One PCI Express bus 42a,b is coupled to the corresponding expansion slot 26a,b. The other PCI Express bus 44 is coupled to the other blade and is not used in this configuration—thus it is shown dotted. The I/O modules 36a,b are PCI Express cards, including PCI Express controllers 46a,b coupled to the respective bus 42a,b. Each I/O module 36a,b includes I/O logic 48a,b coupled to the PCI Express controller 46a,b for interfacing between the PCI Express bus 42a,b and various interfaces 50a,b such as one or more Fibre Channel ports, one or more Ethernet ports, etc. depending on design requirements. Furthermore, by employing a standard bus interface such as PCI Express, off-the-shelf PCI Express cards may be employed as needed to provide I/O functionality with fast time to market.

The configuration of FIG. 2 is particularly useful where the storage system 10 is used as a NAS. The NAS is I/O intensive; thus, the I/O cards provide the blades 22a,b with extra I/O capacity, for example in the form of gigabit Ethernet ports.

Figure 3:
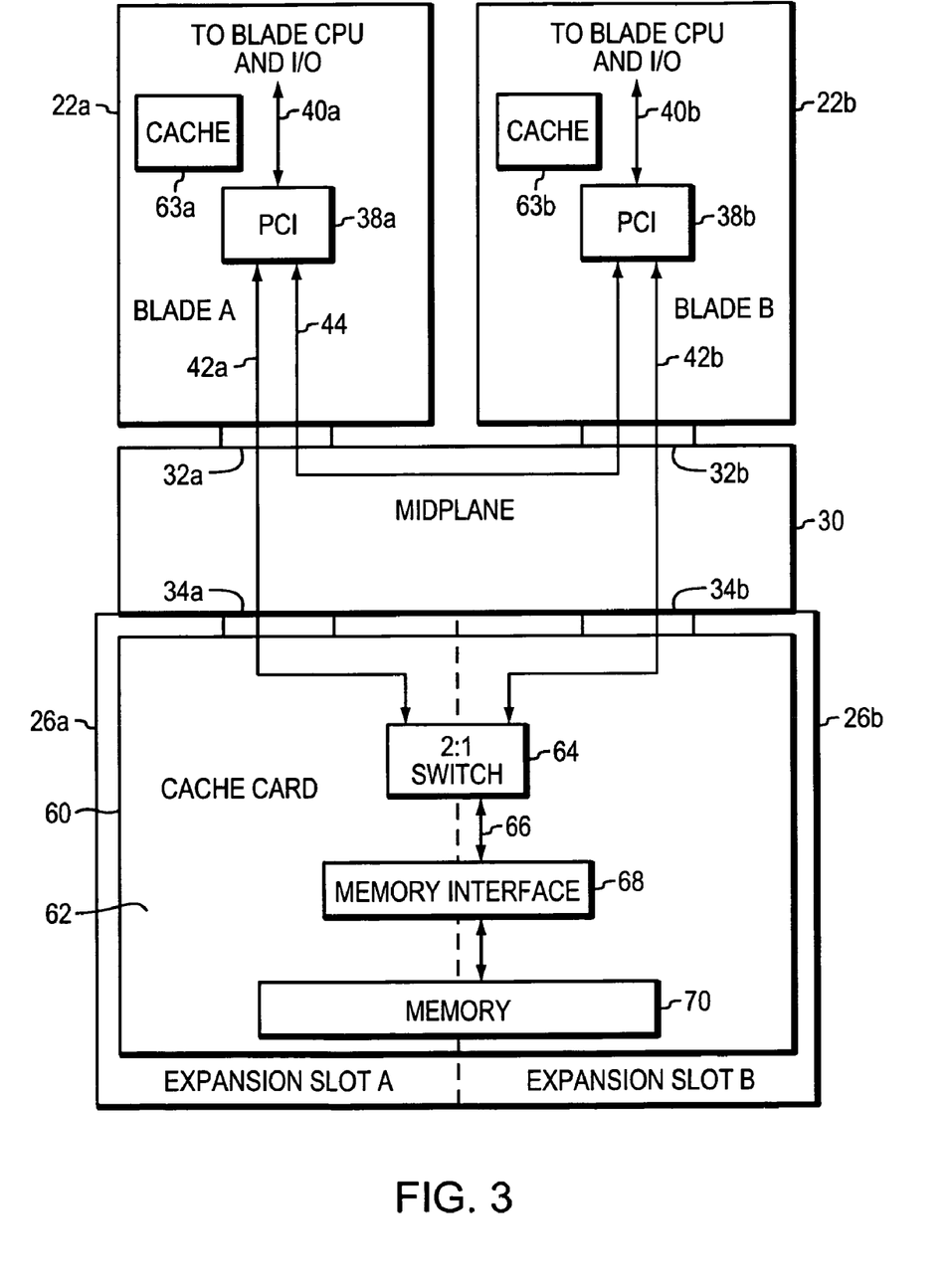
FIG. 3 is a schematic representation of a second configuration of the system of FIG. 1 showing the blades, two expansion slots, and one shared cache memory card installed in both the expansion slots.

Referring to FIG. 3, there is shown an alternate arrangement for use of the expansion slots 26a,b. In this arrangement, a single shared resource 60 is inserted in both the expansion slots 26a,b and is shared by the blades 22a,b (hereinafter, storage processors or SPs 22a,b). The shared resource 60 may be for example a cache card 62. The cache card 62 is particularly useful for purposes of high availability in a SAN arrangement. In a SAN arrangement using redundant SPs 22a,b as shown, each SP includes cache memory 63a,b for caching writes to the disks. During normal operation, each SP's cache is mirrored in the other. The SPs 22a,b mirror the data between the caches 63a,b by transferring it over the PCI Express bus 44, which provides a Communication Manager Interface (CMI) path between the SPs. If one of the SPs, for example SP 22a, fails, the mirrored cache 63a becomes unavailable to the other SP 22b. In this case, the surviving SP 22b can access the cache card 62 via the PCI Express bus 42b for caching writes, at least until the failed SP 22a recovers or is replaced.

As seen in FIG. 3, the cache card 62 includes a two-to-one PCI Express switch 64 coupled to the PCI Express buses 42a,b. The switch 64 gates either of the two buses to a single PCI Express bus 66 coupled to a memory interface 68. The memory interface 68 is coupled to the cache memory 70. Either SP 22a or 22b can thus communicate with the cache memory 70.

Referring to both FIGS. 2 and 3, it is noted that the PCI Express bus 44 is not used in the NAS arrangement but is used in the SAN arrangement. Were the PCI Express switches 38a,b not provided, the PCI Express bus 40a,b would be coupled directly to the PCI Express bus 44 for SAN functionality and thus would not be usable in the NAS arrangement. Through addition of the switches 38a,b, the PCI Express bus 42a,b is useful in the NAS arrangement when the PCI Express bus 44 is not in use, and is useful in the SAN arrangement during an SP failure. Note that the PCI Express bus 44 and the PCI Express buses 42a,b are not used at the same time, so full bus bandwidth is always maintained.

With respect to switches 38a, 38b, 64 and controllers 46a, 46b, the PCI Express standard provides for the advertisement of credits by a receiver, for Headers and Payload, for three types of transactions: Posted, Non-Posted, and Completion. The more credits advertised, the better the performance for that type of transaction; in other words, the transmitter will not have to begin throttling, due to a lack of available credits. Preferably, a PCI Express device would permanently support high numbers of credits for all transaction types and all ports. Practically, however, since additional credits require additional memory in the device, many devices share available memory among the three types of transactions (i.e., increasing credits for one type of transaction requires decreasing credits for others). Furthermore, PCI Express switches have multiple ports, and may allocate available memory across these ports, as well as across different credit types. Conventionally, devices default to an "average" group of settings in a "one-size-fits-all" approach, which, particularly for generic devices which might be used in a variety of applications, can compromise performance for one or more of the applications. PCI Express supports increasing credits on-the-fly, but decreasing credits is difficult at best, and can require resetting devices.

Figure 5:
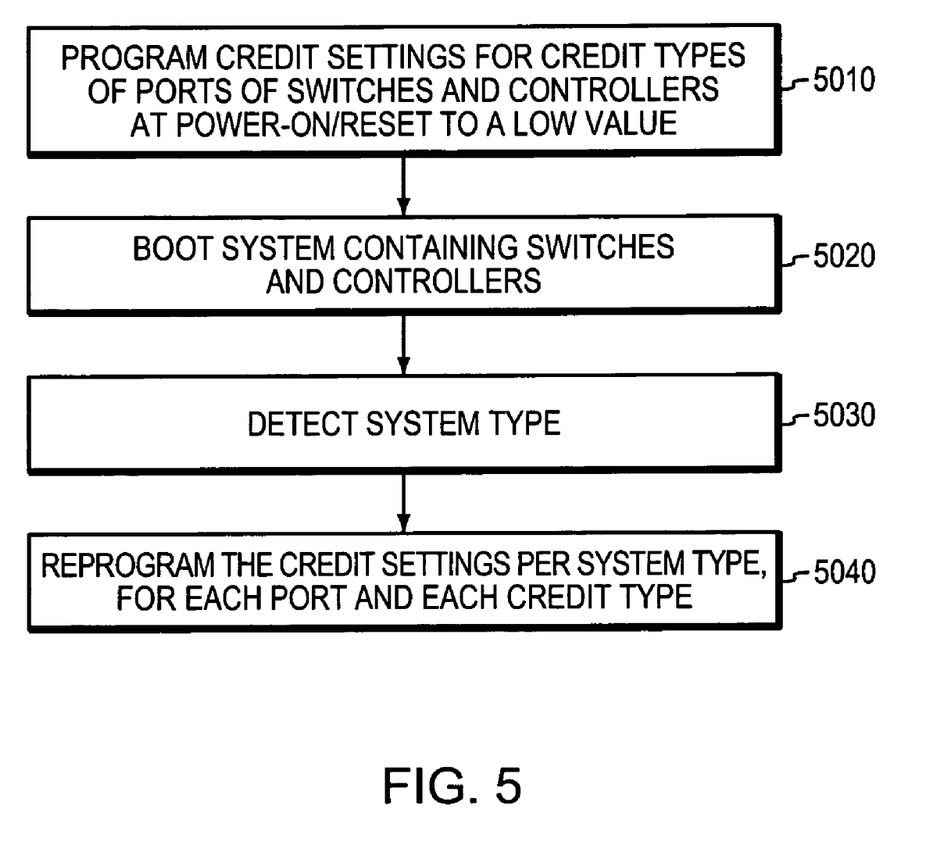
FIGS. 5-6 are flow diagrams of procedures that may be used with the system of FIG. 1.

In at least one embodiment (FIG. 5), in accordance with the flow control enhancement technique, the credit settings for all credit types of all ports of all switches and controllers 38a, 38b, 64, 46a, 46b are programmed at power-on/reset to a low value (step 5010), e.g., a value of 1. This is performed by use of an EEPROM. As the system containing switches and controllers 38a, 38b, 64, 46a, 46b boots (step 5020), firmware detects the system type (step 5030), and reprograms the credits accordingly, for each port and each credit type (step 5040).

Figure 4:
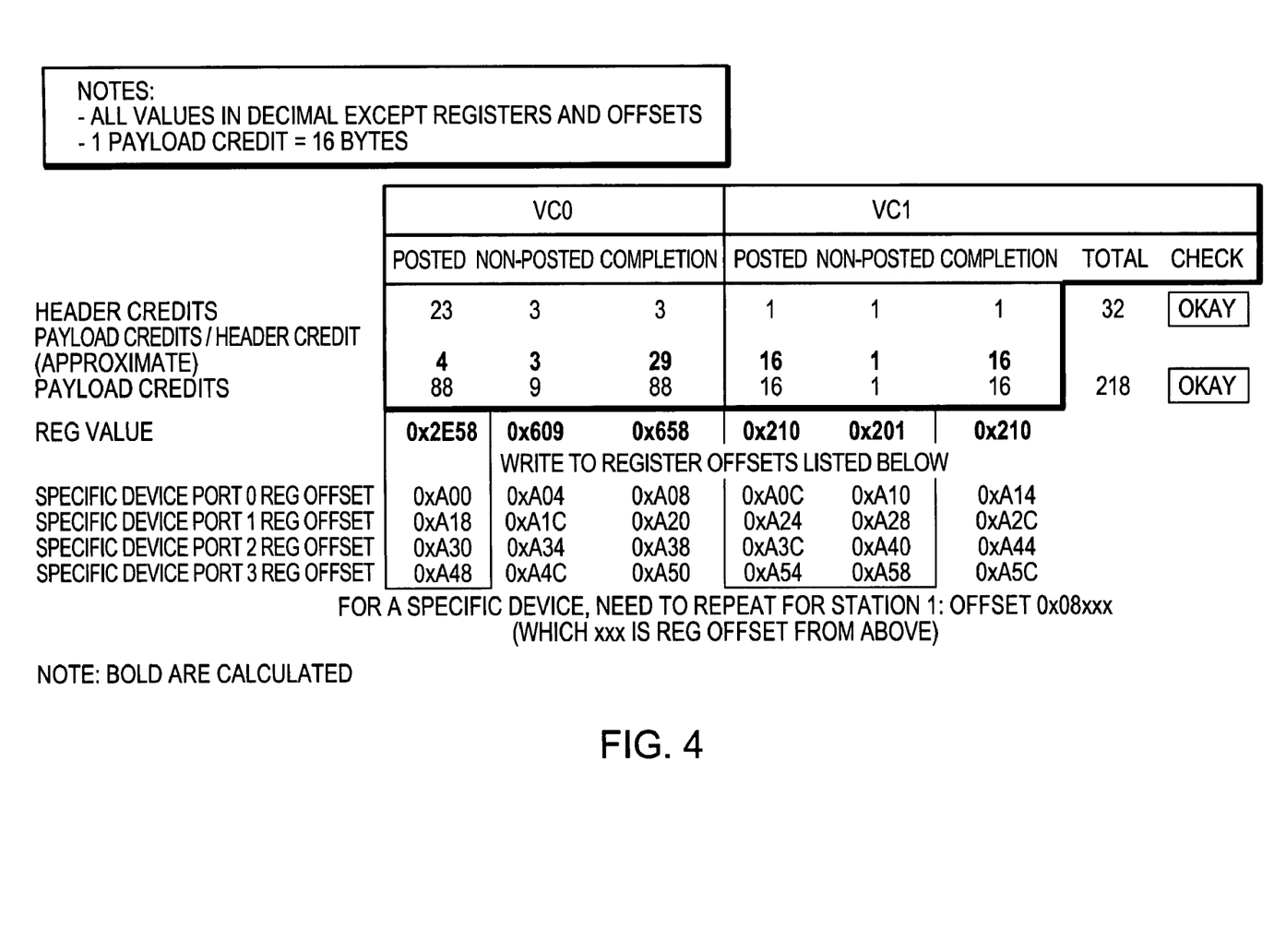
FIG. 4 is an illustration of sample credits settings for use with the system of FIG. 1.
Figure 6:
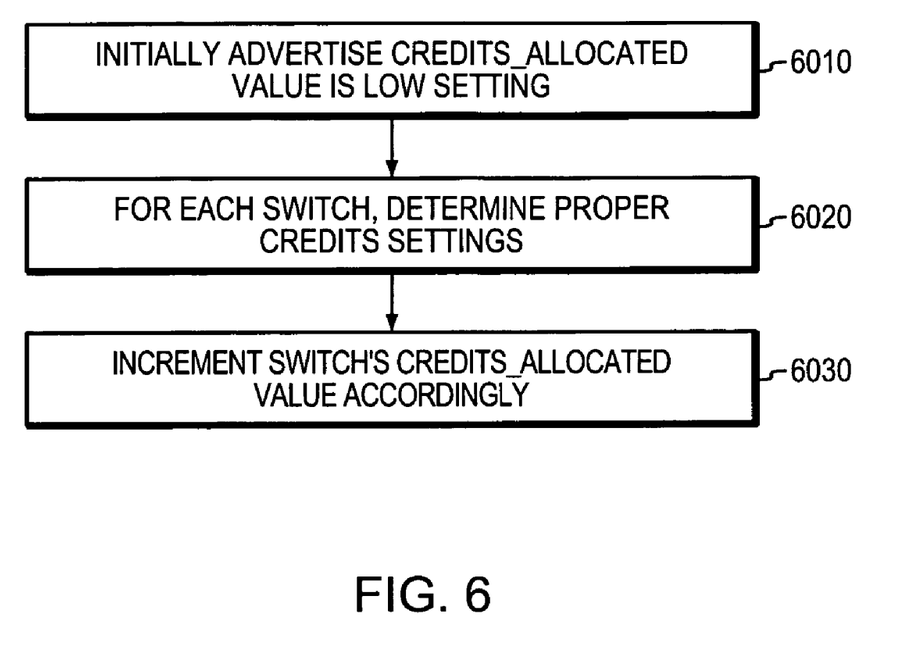

Thus (FIG. 6), each switch initially advertises that its CREDITS_ALLOCATED value is the low setting (step 6010). Thereafter, for each switch, firmware determines the proper credits settings for the switch (e.g., from a table such as table 4000 of FIG. 4) (step 6020), and increments the switch's CREDITS_ALLOCATED value accordingly (step 6030). For example, if the low setting is 1 and the proper setting is 15, the firmware adds 14 to the current CREDITS_ALLOCATED value. Thus, the next time the switch issues an UpdateFC DLLP to a transmitter, the transmitter sets its CREDIT_LIMIT to the CREDITS_ALLOCATED value in the UpdateFC DLLP, thereby incorporating the addition of 14 credits. (To the transmitter, this is equivalent to a situation in which it has somehow missed one or more earlier UpdateFC DLLPs and therefore needs to catch up, in the amount of 14 credits.) In this way both the switch and the transmitter are configured to use the proper setting of 15.

For example, in the configuration of FIG. 3, communication on bus 44 is all or nearly all posted transactions (e.g., on each side of bus 44, a DMA engine on an MCH is used to push data across bus 44). Thus, switches 38a, 38b initially advertise the low credit settings for use over bus 44, but if the configuration of FIG. 3 is detected, bus 44 ports of switches 38a, 38b are set to use higher credit settings corresponding to all or nearly all posted transactions. In at least some cases at least one credit needs to be reserved for a nonposted and completion transactions so that setup information can be communicated, e.g., during initialization.

Also in the configuration of FIG. 3, buses 42a, 42b are used for switches 38a, 38b to communicate with switch 64, which provides access to memory 70. Thus if the configuration of FIG. 3 is detected after the initial advertisement of the low credit settings, ports of switches 38a, 38b for buses 42a, 42b are set to use higher credit settings appropriate for accessing memory 70 through switch 64.

On the other hand, in the configuration of FIG. 2, buses 42a, 42b are used for switches 38a, 38b to communicate with respective controllers 46a, 46b, which provide I/O access to expansion slots. Thus if the configuration of FIG. 2 is detected after the initial advertisement of the low credit settings, ports of switches 38a, 38b for buses 42a, 42b are set to use higher credit settings appropriate for accessing expansion slots through controllers 46a, 46b.

Furthermore in the configuration of FIG. 2, bus 44 is not used at all. Thus if the configuration of FIG. 2 is detected after the initial advertisement of the low credit settings, ports of switches 38a, 38b for bus 44 are not set to use higher credit settings. In at least one implementation, no VC is provided for bus 44.

In at least some implementations it is important or necessary that the higher credit settings do not correspond to device memory use that the device does not support. Thus, for example, if the higher credit settings, in total, represent an amount of device memory in excess of the actual amount of device memory available to support credits, unexpected and/or detrimental results may occur, which may halt the system or otherwise adversely affect performance of the system.

Accordingly, logic executing before and/or concurrently with the determination of the appropriate higher credit settings may be used to help make sure that credits settings are balanced and that device memory is not over-allocated. For example, spreadsheet logic may be used to help balance the higher credit settings, so that device memory is not over-allocated. In at least some devices, credits settings cannot be maximized simultaneously for all types of transactions, and therefore raising the credit setting for one type of transaction may require lowering the credit setting for at least one other type of transaction. Spreadsheet logic or similar logic may be used to accomplish such balancing.

In addition, tailoring the higher credit settings to the application helps prevent excessive concurrency problems and back pressure among a chain of switches or devices. For example, in the configuration of FIG. 3, it may be appropriate for switches 38a, 38b to allocate approximately the same amount of credits for bus 44 as for buses 42a, 42b. However, such an allocation, if used in the configuration of FIG. 2, would allow device memory thereby dedicated to bus 44, which is unused in the configuration of FIG. 2, to remain idle when it could be used to allow more transactions with switch 64 to be pipelined and in process at the same time, which would improve performance.

With respect to at least some devices, UpdateFC DLLPs are not issued immediately when device memory is freed up. Thus, allocating device memory for the specific configuration provides more memory resources to help avoid throttling and to absorb additional transactions and avoid back pressure.

In at least some implementations, a credit setting of zero is avoided even if the corresponding transaction is expected never to be used. This allows all capabilities of the device to be preserved with at least a minimum level of performance.

In at least some implementations, credit settings may not be the same for both directions of a communications link, particularly if traffic of a particular transaction type is expected to occur more in one of the directions than the other.

Other embodiments are within the scope of the invention. For example, one or more of the techniques described above may be used with systems other than PCI Express systems.

The invention claimed is:

1. A method for use in configuring flow control settings, comprising:
   at power-on/reset of a computer system, programming credit settings for credit types of input/output interconnect ports in the computer system at a low value, wherein the low value is a value of 1, wherein the credit settings are for switches and controllers, wherein each switch initially advertises that CREDITS_ALLOCATED value for the switch is the low value;
   as the computer system boots, detecting a system type of the computer system containing the input/output interconnect ports, wherein the system type is detected from within a set of system types comprising a first system type comprising an I/O module and a second system type comprising a cache card in place of the I/O module;
   as the computer system boots, reprogramming the credit settings in accordance with the system type and in accordance with the type of each input/output interconnect port and the credit types, wherein the reprogramming of the credit settings comprises raising a credit setting for a first transaction and lowering a credit setting for a second transaction;
   reprogramming the credit settings in accordance with a balance of memory limitations corresponding to the credit settings; and
   avoiding reprogramming other credit settings for other input/output interconnect ports in the system.

2. The method of claim 1, wherein the credit settings are programmed at a low value at power-on or reset.

3. The method of claim 1, wherein the credit settings are reprogrammed to a higher value.

4. The method of claim 1, wherein the reprogramming of the credit settings for the switch is based on a predetermined table.

5. The method of claim 1, wherein the reprogramming of the credit settings includes reprogramming a switch's CREDITS_ALLOCATED value.

6. The method of claim 1, further comprising:
   when a switch issues an UpdateFC DLLP message to a transmitter, setting the transmitter's CREDIT_LIMIT value to a CREDITS_ALLOCATED value in the UpdateFC DLLP message.

7. The method of claim 1, wherein a switch and a transmitter are configured to use the same setting.

8. The method of claim 1, further comprising
   avoiding using a credit setting of zero.

9. The method of claim 1, further comprising
   reprogramming the credit settings also such that the credit settings are not the same for both directions of a communications link.

10. A system for use in configuring flow control settings, comprising:
    a storage system, wherein the storage system includes non-volatile memory, firmware, and program logic in communication with the storage system for carrying out the steps of:
    at power-on/reset, programming credit settings for credit types of input/output interconnect ports at a low value, wherein the low value is a value of 1, wherein the credit settings are for switches and controllers, wherein each switch initially advertises that CREDITS_ALLOCATED value for the switch is the low value;
    as the system boots, detecting a system type of the system containing the input/output interconnect ports, wherein the system type is detected from within a set of system types comprising a first system type comprising an I/O module and a second system type comprising a cache card in place of the I/O module;
    as the system boots, reprogramming the credit settings in accordance with the system type and in accordance with the type of each input/output interconnect port and the credit types, wherein the reprogramming of the credit settings comprises raising a credit setting for a first transaction and lowering a credit setting for a second transaction;
    reprogramming the credit settings in accordance with a balance of memory limitations corresponding to the credit settings;
    and avoiding reprogramming other credit settings for other input/output interconnect ports in the system.

11. The system of claim 10, wherein the credit settings are programmed at a low value at power-on or reset.

12. The system of claim 10, wherein the credit settings are reprogrammed to a higher value.

* * * * *